US011444491B1

(12) United States Patent
Mor et al.

(10) Patent No.: US 11,444,491 B1
(45) Date of Patent: Sep. 13, 2022

(54) WIRELESS POWER TRANSMISSION SYSTEM USING RECEIVER-REFLECTED POWER FOR CONTROLLING TRANSMITTED POWER

(71) Applicant: Wi-Charge Ltd., Rehovot (IL)

(72) Inventors: Ori Refael Mor, Tel Aviv (IL); Ortal Alpert, Ness Ziona (IL); Nir Simon, Kibbutz ein Hashofet (IL); Lior Golan, Ramat Gan (IL)

(73) Assignee: Wi-Charge Ltd., Rehovot (IL)

( * ) Notice: Subject to any disclaimer, the term of this patent is extended or adjusted under 35 U.S.C. 154(b) by 0 days.

(21) Appl. No.: 17/500,597

(22) Filed: Oct. 13, 2021

(30) Foreign Application Priority Data

Apr. 22, 2021 (IL) .......................................... 282599

(51) Int. Cl.
*H02J 50/27* (2016.01)
*H02J 50/80* (2016.01)
*H02J 50/40* (2016.01)
*H01Q 3/36* (2006.01)
*H02J 50/90* (2016.01)

(52) U.S. Cl.
CPC ............ *H02J 50/27* (2016.02); *H02J 50/402* (2020.01); *H02J 50/80* (2016.02); *H01Q 3/36* (2013.01); *H02J 50/90* (2016.02)

(58) Field of Classification Search
CPC .............................. H02J 50/20–27; H02J 50/90
See application file for complete search history.

(56) References Cited

U.S. PATENT DOCUMENTS 3,795,910 A * 3/1974 Robinson, Jr. .......... G01S 13/02
342/82
4,360,741 A * 11/1982 Fitzsimmons .......... H02J 50/27
307/151

(Continued)

FOREIGN PATENT DOCUMENTS

WO 2020215082 A1 10/2020

OTHER PUBLICATIONS

Israel Search Report for Application No. 282599 dated Sep. 9, 2021, 2 Pages.

(Continued)

*Primary Examiner* — Rexford N Barnie
*Assistant Examiner* — David A Shiao
(74) *Attorney, Agent, or Firm* — Maine Cernota & Rardin (57) ABSTRACT

A system for safe transmission of an RF electromagnetic power beam to a receiver for conversion into electric power. The receiver has an antenna array for receiving the RF beam and electrical circuitry to receive a corresponding RF electrical current from the antenna array. The circuitry includes a converter for generating DC current from the RF electrical current, and includes at least one component that reflects part of the RF current back towards the antenna array. This converts the reflected portion of the RF electrical current into a retransmitted RF electromagnetic beam having the same frequency as the RF electromagnetic power beam, and is directed back towards the transmitter. The receiver monitors the reflected RF current, and transmits a proportional signal back to a controller. The controller reduces the transmitted power beam if its interference with the retransmitted beam would generate a field intensity above a safe level.

19 Claims, 6 Drawing Sheets

(56) References Cited

U.S. PATENT DOCUMENTS

| | | | |
|---|---|---|---|
| 8,284,101 B2 | 10/2012 | Fusco | |
| 9,893,554 B2 | 2/2018 | Bell et al. | |
| 9,941,730 B1 * | 4/2018 | Kim | H02J 7/025 |
| 10,153,660 B1 | 12/2018 | Leabman et al. | |
| 10,320,242 B2 | 6/2019 | Hajimiri et al. | |
| 2013/0062959 A1 | 3/2013 | Lee | |
| 2015/0200568 A1 * | 7/2015 | Takei | H02J 7/025 |
| | | | 307/104 |
| 2015/0311726 A1 * | 10/2015 | Tani | H02J 50/90 |
| | | | 307/104 |
| 2016/0094091 A1 * | 3/2016 | Shin | H01Q 9/0414 |
| | | | 307/104 |
| 2016/0094092 A1 * | 3/2016 | Davlantes | H02J 50/20 |
| | | | 307/104 |
| 2017/0250559 A1 * | 8/2017 | Narayanan | H02J 7/025 |
| 2017/0288475 A1 * | 10/2017 | Lee | H04L 5/0048 |
| 2018/0069438 A1 * | 3/2018 | Bit-Babik | H02J 50/20 |
| 2019/0181696 A1 * | 6/2019 | Arnitz | H01Q 21/29 |
| 2019/0245389 A1 * | 8/2019 | Johnston | H02J 50/60 |
| 2019/0356172 A1 | 11/2019 | Hajimiri et al. | |
| 2020/0021128 A1 | 1/2020 | Bell et al. | |
| 2020/0119591 A1 * | 4/2020 | Arnitz | H02J 50/402 |
| 2020/0196097 A1 | 6/2020 | Hajimiri et al. | |
| 2020/0204002 A1 | 6/2020 | Hajimiri et al. | |

OTHER PUBLICATIONS

Office Action and English Translation for Israel Patent Appl. No. 282599 dated Sep. 12, 2021, 7 Pages.

\* cited by examiner

WIRELESS POWER TRANSMISSION SYSTEM USING RECEIVER-REFLECTED POWER FOR CONTROLLING TRANSMITTED POWER

RELATED APPLICATIONS

This application claims priority to Israel Application Number IL 282599 filed on Apr. 22, 2021.

FIELD

The present disclosure relates to the field of Radio Frequency power transmission systems, especially to systems ensuring accurate detection of receivers in the vicinity of the transmitter, and safety from harmful exposure to humans or animals in that vicinity.

BACKGROUND

In recent years, numerous systems and methods have been suggested to allow the safe and regulatory compliant transmission of electrical power through space. Such methods and systems are used to support the growing need to provide mobile and portable devices with power, as well as to facilitate simple installation of various "Internet of Things" (IOT) devices and sensors, to support the smart home, smart industry and industry 4.0 environments.

Various types of wave propagation have been suggested, with the waves being the carrier wave for this energy transmission, including radio waves of various frequencies, especially Wi-Fi frequencies and microwave frequencies), frequencies in the GHz ranges, visible light, infrared light, and even sound waves.

These different waves may interact with various devices and bodies, unrelated to the use for which the waves are being propagated, such as pacemakers, transistor radios, materials, living matter such as humans, animals and plants, and communication devices.

In order to regulate and facilitate operation of multiple devices in the same environment in a safe manner and without interference with other devices, different frequencies have been allocated for different applications and exposure limits have been set by regulating bodies.

Where multiple devices operate in the vicinity of each other, it is the responsibility of each of the manufacturers/operators to ensure that the devices operate in a way that assures that the total effect of all devices operating does not exceed safety limits.

In the case of wireless power systems, this is doubly so, as both the transmitter and the receiver emit radiation, often at exactly the same frequency, which may combine to exceed safety limits.

Another problem which needs addressing is the need to direct the wave energy only at receivers capable of receiving it, and the need to detect such receivers and define their exact position, while also validating their capabilities.

The safe exposure levels to humans and animals are dependent on the frequency of the electromagnetic waves—whether ionizing or non-ionizing. RF waves are non-ionizing, but may cause damage by generating internal heating in organs. The levels of radiation which are permitted are determined by regulatory documents, such as the OET56, and the OET 65 series of bulletins, issued by the Federal Communications Commission (FCC):
https://www.fcc.gov/bureaus/oet/info/documents/bulletins/oet56/oet56e4.pdf
https://www.fcc.gov/bureaus/oet/info/documents/bulletins/oet65/oet65.pdf
https://www.fcc.gov/bureaus/oet/info/documents/bulletins/oet65/oet65a.pdf
https://www.fcc.gov/bureaus/oet/info/documents/bulletins/oet65/oet65b.pdf
https://apps.fcc.gov/oetcf/kdb/forms/FTSSearchResultPage.cfm?switch=P&id=20676

In typical existing systems for sending Radio Frequency energy to a remote receiving device, the transmitter directs a power beam towards the receiver, and there should be a safety system which typically attempts to detect objects in the beam and reduce the beams power if such an object is detected. Such a safety system may be based on a camera, or on reflections from such objects or on reflection or scattering from the receiver.

The present disclosure attempts to provide novel systems and methods that overcome at least some of the disadvantages of prior art systems and methods.

The disclosures of each of the publications mentioned in this section and in other sections of the specification, are hereby incorporated by reference, each in its entirety.

SUMMARY

The present disclosure describes new exemplary systems for safe transmission and reception of wireless power, especially involving transmission of beams in the millimeter wave region, having a frequency between 18 and 300 Ghz, though even more specifically in the preferred bands at 61.125 Ghz and at 24.125 GHz, which are allotted for such millimeter wave power transmission. However, the system architecture described in this disclosure can also operate with other RF beams or laser beams.

The receiver of such a system typically consist of an antenna or array of antennas converting the electromagnetic wave power transmission into electrical power, such as could be used for charging the battery of such a receiver, or for powering any other device associated with the receiver, driven wirelessly by such power transmissions.

A first specific characteristic of the systems described in the present disclosure, is that they can facilitate a search procedure for receivers located in the vicinity of the transmitter, such that they can detect the exact direction of the receiver relative to the transmitter in a simple, accurate and robust manner, as will be described hereinbelow.

Another characteristic of these systems is related to the need to maintain their operation safe for humans and animals which may come within the region of the transmission. Safety is ensured by preventing dangerous or damaging radiation fields from being generated, in spaces where humans and animals may be harmed by such fields. It is a common understanding that RF power densities of above 1 $mW/cm^2$ may be harmful to humans and animals. Transmissions which may impinge on humans or animals with a power density above this level, are generally forbidden by regulatory bodies, such as the FCC (see OET56). The presently described systems attempt to prevent such power densities from being created or from being accessible by living things.

An important feature of the systems described in the present disclosure is the achievement of safe operation by utilizing a retransmitted RF wave returned as a beam directed at a defined angle from the receiver, rather than the methods typically used in previous systems in which randomly scattered RF radiation is used to determine the presence of a receiver. This retransmitted RF wave is generated by retransmission of the reflection of the input RF current, from a component in the receiver circuitry having a non-linear response characteristic to the voltage falling on it, and therefore an unmatched impedance characteristic, such that part of the input RF current will be reflected back rather than being utilized in the receiver. One such candidate component of the receiver circuitry is the diode or diode bridge used to convert the RF current to a DC current.

This retransmitted RF wave can therefore be used in several different ways in the presently described systems:

Firstly, the strength of the retransmitted RF wave can be used in order to determine how the transmitted beam is impinging on the receiver antenna, since the more accurately the transmitted beam is impinging on the receiver antenna, the higher will be the level of the retransmitted returned beam. That level can therefore be used to adjust the scan direction of the transmitted beam to provide optimal coupling to the receiver.

Secondly, by monitoring the actual level of the retransmitted RF wave, the system is able to determine whether interference between the retransmitted RF wave and the transmitted input power beam may result in regions of RF power density, which will exceed the allowed power density for safe use of the system. Both of these functions can be achieved using a separate wireless communication channel between the transmitter and the receiver or by encoding the information onto the retransmitted wave, in order to transmit to the system controller, the level of the reflected RF current in the receiver circuitry, which can then be related to the power of the retransmitted RF wave. The communication channel can also be used for transmitting identification and other data. Additional manipulation features of the reflected RF current are also used in the presently described RF power transmission systems, as will be described hereinbelow.

Thirdly, by monitoring the level of the retransmitted RF wave, it can be instantaneously determined whether an object has entered the beam, since the retransmitted RF wave will abruptly fall when this occurs, and the beam power can then be reduced, typically to zero, to maintain safety. This function can also be achieved if the input RF current is monitored in the receiver, and the value thereof used in order to determine the continued level of the impingement of beam on the receiver.

Referring now to brief details of how these systems are implemented, the receiver converts the incoming electromagnetic wave into an RF current, using at least one antenna, and most advantageously, a phased array of antennas. Such a phased array has the advantage that the polar diagram of the antenna array, which defines the direction of optimal sensitivity of the antenna array, can be readily and speedily controlled by manipulation of the phase relationship between the RF currents output from each element of the phased array.

The RF current derived from the antenna array is converted into a DC current by an AC/DC converter, typically using a diode bridge. In some implementations, the AC/DC conversion may be implemented by other components such as sensors and transistors. Such AC/DC conversion devices are typically non-linear electrical components, and a portion of the RF current would be reflected back towards the antenna as a result of inherent impedance mismatch of the AC/DC converter. The main part of the input RF current is transmitted by the diode bridge, and converted to the usable DC current.

When the reflected portion of the RF current reaches the antenna array, it causes the antenna array to emit an electromagnetic wave having the same frequency as the originally received RF power transmission. However, since the reflected RF current may include harmonics of the fundamental frequency because of its interaction with the nonlinear components, this retransmitted return wave may also contain those harmonics of that fundamental frequency. Since dissemination of such harmonics may be forbidden by regulatory directives, a filter located between the antenna and the AC/DC converter, may be necessary in order to filter out such harmonics.

There are two methods by which the separate outputs from each element of the antenna array can be connected to AC/DC converter(s). According to a first implementation, the RF output current from each antenna element undergoes a time delay by passage through a phase shifter. The phase shifters have sequentially arranged phase shifts, such that even though the input RF currents from the antenna elements have different mutual phases, resulting from the different times of arrival of the incoming RF wave, assuming that it is not normally incident, the different delays applied to the RF currents coming from successive antenna elements, brings all of the RF currents into essentially the same phase. They can then be additively summed, and converted to a DC current in a single AC/DC converter.

According to a second implementation, each antenna RF current is handled in its own circuit, and converted in its own AC/DC converter, and the resulting DC currents can then be additively summed to a single DC current.

These two implementations result in different retransmitted waves. When the phase shifter implementation is used, the retransmitted wave will be emitted from the phased array antenna along the same path as the incident transmission beam, but counter propagating to the original incident transmission beam, such that it will be directed as a beam towards the transmitter. This feature may be used to aim the beam at the receiver accurately.

However, this feature of the retransmitted wave may result in constructive interference between the incoming transmitted wave, and the retransmitted returned wave, since they have the same frequency and a known phase relationship, and are traversing the same path in space. The constructive interference between the two counter propagating waves may result in a high field intensity at fixed points in their path where the two waves are in phase. The intensity at these high intensity points is typically much greater than the sum of the two waves. For example, if the field of the retransmitted wave is only 10% of the forward wave, the resulting hotspots may have 1.73 times the power intensity of the forward transmitted wave at spaced apart interference positions of its path. This interference pattern wave would be moving, albeit slower than the speed of light, and fixed hotspots are therefore generated at intervals along its path. Unlike scattered radiation, which is used in some previous systems, the retransmitted wave of the presently described systems is directional, increasing the likelihood of such constructive interference. The retransmitted wave is also very useful as it offers a directionally defined and controlled beam of power.

On the other hand, when the multiple AC/DC converters without phase shifters implementation is used, the resulting retransmitted wave would typically be reflected in a different direction (the direction of Fresnel reflection), and would thus not be counter propagating along the same path as the incoming RF wave, and a smaller number of hotspots would be created. However, the intensity of these hotspots could still be significantly higher than the local intensity of the original transmitted wave and it is still important to maintain those hotspots below a safe intensity.

Information regarding the expected magnitude of the re-transmitted return wave can be obtained by means of a sensor detecting the level of the reflected RF current returning to the antenna. This information can then be transferred to the system controller, that is most conveniently situated in the transmitter unit, and converted into information regarding the intensity of the retransmitted RF wave. The controller can then determine whether constructive interference of the retransmitted wave with the outwardly transmitted power beam would result in field intensities along the beam path, exceeding the allowed safe level for the system. When such an excessive field intensity is determined, the controller can reduce the transmitted power accordingly, or even shut down the transmission, thereby maintaining safety of the system operation.

One method of achieving the above described safety procedure is to reduce the level of the retransmitted wave, such that any interference hotspots will be below the limit of permitted RF radiation. This can be achieved by use of a reflected wave suppressor, which can take a number of forms.

Firstly, a current sensor situated in the receiver circuitry between the antenna elements and the AC/DC converter or converters, can be used for measuring the level of the reflected RF current. Such a current sensor can take the form of a microstrip directional coupler, which provides a fraction of the mainline RF current at the output coupled port, where a detector can be used to provide a voltage signal proportional to the reflected RF current. The signal can then be transferred by means of a wireless communication channel to the controller, conveniently located within the transmitter, and if the level of the implied retransmitted RF wave is sufficiently high that unpermitted RF interference fields are expected, the transmission power can be reduced accordingly, or its parameters amended, such as the frequency, phase, or duty cycle of the transmitter output.

Alternatively, or additionally, an isolator, such as a ferrite based Faraday isolator, can be installed in the receiver circuitry between the antenna and the AC/DC converter or converters, which will attenuate any backward reflected RF currents. This will have the effect of reducing the retransmitted RF fields, such that there will be less likelihood of excessive fields arising from interference with the transmitted RF power beam.

In summary, the reflected wave suppresser has two main objectives:

(a) It allows control of the power of the returning wave such that, on the one hand, the interference pattern with the transmitted power wave does not create unpermitted hotspots, which may exceed levels allowed by safety and regulatory requirements.

(b) On the other hand, the level of the returning wave can remain sufficient that it still allows the retransmitted returning wave to be detected in the transmitter, to facilitate detection of the presence of a receiver, aiming of the transmitted power beam at the receiver, and transmitting data back to the power transmitter regarding the status of the power received by the receiver.

There is thus provided in accordance with an exemplary implementation of the devices described in this disclosure, a receiver for absorbing a first RF electromagnetic beam transmitted from a transmitter, and converting it into electrical power, the receiver comprising:

(i) an array of antennas for receiving the first RF electromagnetic beam;

(ii) electrical circuitry connected to receive RF electrical current from the array of antennas, the electrical circuitry comprising at least one converter for generating a DC current from the RF electrical current, and at least one component that reflects a first portion of the RF electrical current back towards the antenna array; and (iii) a transmitting device associated with the receiver, adapted to send to a controller associated with the transmitter, information relating to the level of the first portion of the RF electrical current reflected back towards the antenna array, wherein the antenna array is configured to convert the reflected first portion of the RF electrical current into a second RF electromagnetic beam for retransmission from the antenna array, the second RF electromagnetic beam having the same fundamental frequency as the first RF electromagnetic beam.

In such a receiver, a second portion of the RF electrical current may be converted into the DC current. In either of these cases, the one or more component that reflects a first portion of the RF electrical current back towards the antenna array may be at least one of a rectifying device, a rectifying bridge, a diode, or a semiconductor device. Additionally, the area of the array of antennas is at least 10 cm$^2$.

At least one filter may be positioned between the at least one component that reflects a first portion of the RF electrical current back towards the antenna array, and the antenna array, the filter being configured to attenuate the level of at least a first harmonic of the reflected RF electrical current. In that case, the attenuation of the level of the at least first harmonic of the reflected RF electrical current should reduce the level of the at least first harmonic component of the retransmitted second RF electromagnetic beam to a level below that allowed by a regulatory authority.

The controller may be configured to change the power transmitted by the transmitter towards the receiver, if the information relating to the level of the first portion of the RF electrical current reflected back towards the antenna array indicates that interference of the retransmitted second RF electromagnetic beam with the transmitted first RF electromagnetic beam would generate at least one local RF field intensity which exceeds a predetermined threshold. In such a situation, the change in the power transmitted by the transmitter towards the receiver may comprise at least one of:

(i) reducing the power of the first RF electromagnetic beam transmitted;

(ii) terminating the power of the first RF electromagnetic beam transmitted; or (iii) diverting the direction of transmission of the first RF electromagnetic beam.

In any of these implementations, the threshold should be an intensity level permitted by a safety regulation.

In any of the above described receivers, the controller may be configured to adjust the direction of transmission of the first RF electromagnetic beam to maximize the level of the first portion of the RF electrical current reflected back towards the antenna array. Such a maximization of the level of the first portion of the RF electrical current reflected back towards the antenna array should indicate that the first RF electromagnetic beam is impinging centrally on the antenna array.

Additionally, in any of these receivers, the information relating to the level of the first portion of the RF electrical current reflected back towards the antenna array may be obtained from a sensor sampling the first portion of the reflected RF electrical current. Such a sensor may be disposed at the coupled port of an output coupler.

In any of the above described receivers, the antenna array may be configured to retransmit the second RF electromagnetic beam either generally back along the direction of the first RF electromagnetic beam or generally in a direction towards which the first RF electromagnetic beam is reflected by the antenna array.

Furthermore, in any of the above described receivers, the electrical circuitry may be configured to add a predetermined time delay to the reflected first portion of the RF electrical current, such that the retransmitting of the second RF electromagnetic beam also has the added predetermined time delay. Such a predetermined time delay may be generated either by circuitry geometry or by a component generating the delay. Additionally, such a predetermined time delay should be configured to be sufficiently long that the controller can detect the retransmitted second RF electromagnetic beam without interference from the transmitted first RF electromagnetic beam.

In accordance with any of the above described receivers, the RF electrical current from each antenna array element may be directed into a separate circuit for conversion to a DC current, and the DC currents from at least some of the separate circuits are added for supplying to a device. Alternatively, the RF electrical current from each antenna array element may be directed into a separate phase shifter adapted to compensate for the phase differences in the RF currents generated in adjacent antenna elements of the array, and the phase shifted RF electric currents may be then combined into a single circuit for conversion to a DC current. In the latter case, the phase shifts generated by the separate phase shifters should be such that all of the RF electrical currents from the separate phase shifters are essentially in phase with each other.

Finally, according to a further implementation of the present disclosure, there is provided a method of absorbing a first RF electromagnetic beam transmitted from a transmitter, and converting it into electrical power, the method comprising:

(i) absorbing the first RF electromagnetic beam on a receiver having an array of antennas for receiving the first RF electromagnetic beam;

(ii) conveying an RF electrical current received from the array of antennas through electrical circuitry to a converter for generating a DC current from the RF electrical current, the electrical circuitry including at least one component that reflects a first portion of the RF electrical current back towards the antenna array; and (iii) transmitting to a controller associated with the transmitter, information relating to the level of the first portion of the RF electrical current reflected back towards the antenna array, wherein the antenna array converts the reflected first portion of the RF electrical current into a second RF electromagnetic beam for retransmission from the antenna array, the second RF electromagnetic beam having the same fundamental frequency as the first RF electromagnetic beam.

The operation of the systems and methods of the present application, have been described in terms of ideal circuitry and geometry which will maintain the phases of the currents at the intended phase shift relative to each other. In practice, this ideal is not generally practical, and there will be phase deviations from the planned phases, which will result in reduced power conversion in the RF to DC converter, and to differently retransmitted RF beams from the antenna. For this reason, the RF beams or RF currents disclosed in this application have often been described as having essentially or generally the same phase as other RF beams or RF currents, or in other cases, having essentially or generally the same phase shift between them, depending on context. This approximation language is intended to reflect the impossibility in practical systems of achieving the perfect phase relationships desired, and the interpretation of the level of deviation implied by terms such as "essentially" or "generally" is understood to be dependent on the circumstances of the situation, and of the accuracy desired of the system. It can be shown that typically, average phase differences of up to 10° to 20° between the RF currents in different antennae do not result in significant power drop and are normally present even in reasonably precision systems. Phase differences of above 35° induce power losses that are still bearable in low power applications, especially if the retransmitted wave is determined to be well below a problematic level. Average phase errors of above 67° result in more than a 50% power loss, which in most applications would be regarded as problematic. In conclusion, the phase approximation terms are to be understood to be interpreted in the light of the system requirements.

BRIEF DESCRIPTION OF THE DRAWINGS

The present invention will be understood and appreciated more fully from the following detailed description, taken in conjunction with the drawings in which.

DETAILED DESCRIPTION OF THE DRAWINGS

Figure 1:
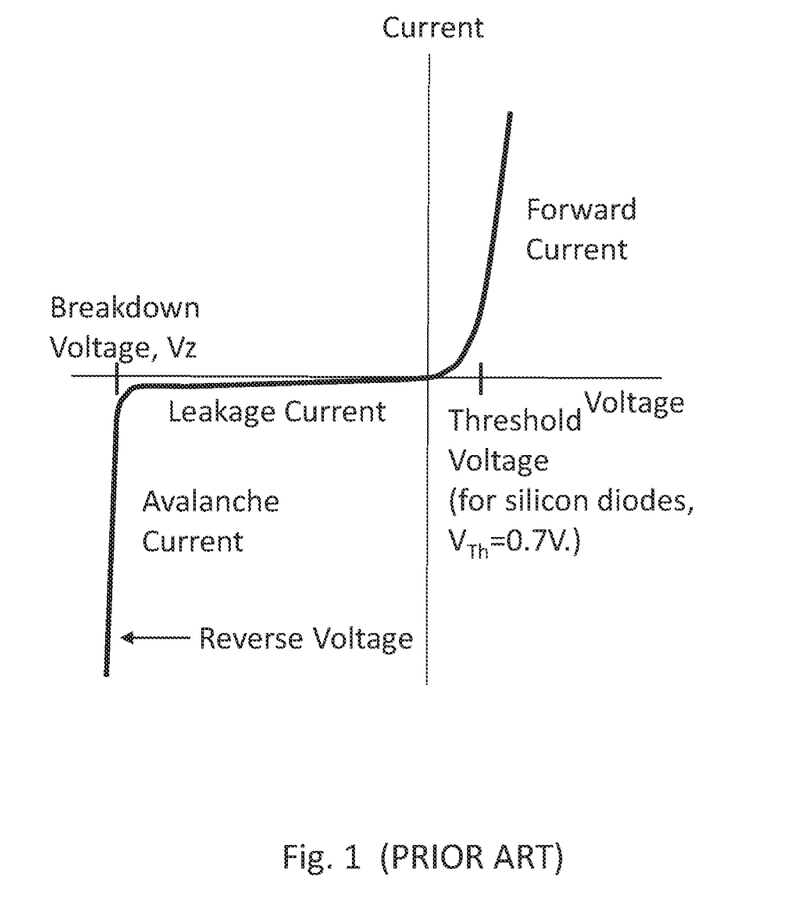
FIG. 1 shows a typical voltage/current characteristic of a diode, such as could be used in a bridge arrangement in order to convert input RF currents in a wireless receiver to a DC current.

Reference is first made to FIG. 1 which shows a typical voltage/current characteristic of a diode, such as could be used in a bridge arrangement in order to convert input RF currents in a wireless receiver to a DC current. The abscissa of the graph shows the voltage V applied across the diode, and the ordinate shows the current I passing through the diode as a result of the applied voltage. The forward threshold voltage of the diode is that voltage at which the forward biased diode begins to conduct substantially. As can be seen in FIG. 1, for input voltages between zero and the forward threshold voltage, the impedance of the diode is highly non-linear. As a result of this nonlinearity, a part of the incoming RF current will be conducted by the diode and converted to DC, while another part would be reflected back from the diode as a result of the inherent impedance mismatch arising from the non-linear input impedance of the diode. This back-reflection can be both at the fundamental input RF frequency, or at a harmonic thereof, depending on the complex input impedance of the diode.

Figure 2:
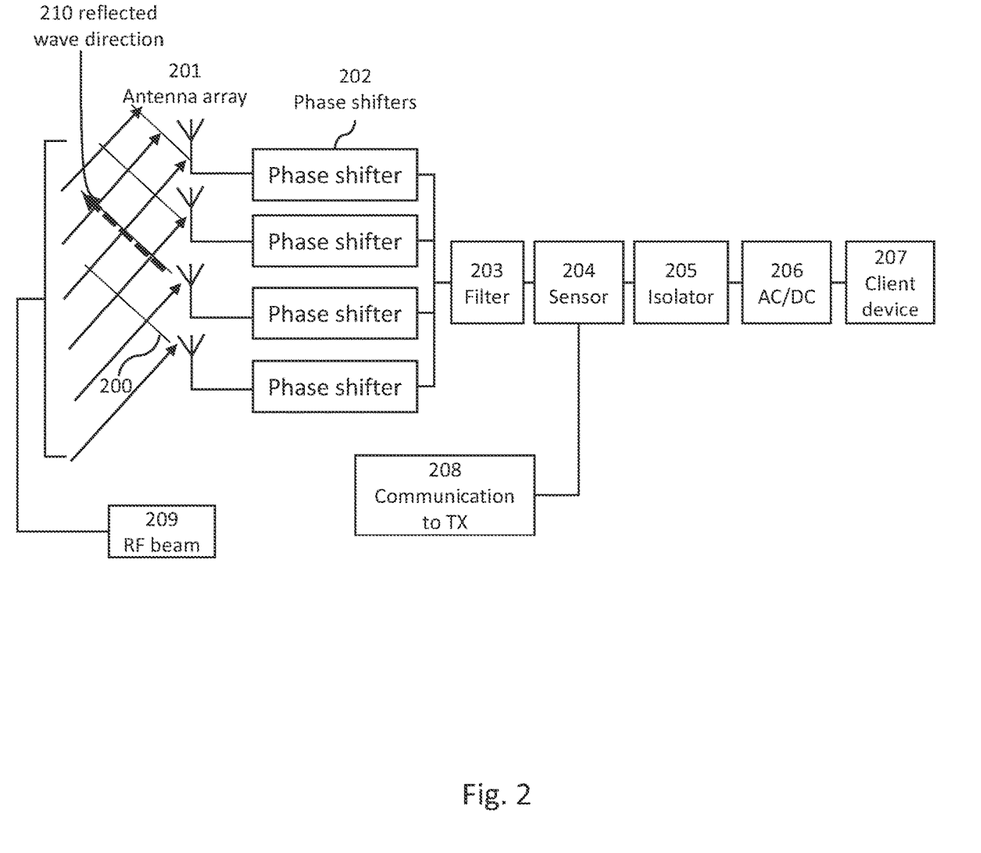
FIG. 2 shows an exemplary embodiment of a receiver adapted to operate according to a first implementation of methods of combining the powers from the elements of a receiver antenna array.

Reference is now made to FIG. 2, shows an exemplary embodiment of a receiver adapted to operate according to a first implementation of the methods of wireless power transfer according to the present disclosure.

A propagating RF beam 209 emitted from the transmitter (not shown in FIG. 2) is represented by the medium thickness lines and propagates from the left bottom side of the drawing towards the top right. RF beam 209 is a coherent beam, and the thin lines 200 represent equiphase wavefronts of the RF transmission. In the absence of a returning wave, the wavefronts propagate at the speed of the wave.

The receiver is equipped with a phased array antenna 201, and the RF beam 209 is absorbed by the antenna array 201, the dimensions of each element in antenna array 201 being adapted to favorably absorb a wave having the frequency of RF wave 209. The lateral dimension of each of the antenna of the array is optimally around half of the wavelength of the RF wave, and to provide some idea of the dimensions involved, these half-wavelength dimensions could range from 1.65 mm for an antenna element optimized to receive a 90 GHz wave, to 8.3 mm for an antenna element tuned to receive an 18 GHz wave.

A portion of RF wave 209 is Fresnel reflected by the antenna array 201 in direction 210, which is at the reflected ray at an angle to the array oppositely aligned to that of the incident beam 209. Since antenna array 201 is adapted to optimally absorb incident RF wave 209, such reflection is typically minimized but typically is always present.

A second portion of RF wave 209 is scattered in random directions by antenna array 201, the amount of scattered radiation being typically minimized by proper design of antenna array 209.

The major portion of RF wave 209, typically over 85% thereof, is absorbed by antenna array 201 and converted to an RF electrical current, and a small amount of heat. Since antenna array 201 is not aligned perpendicular to the propagation direction of RF wave 209, each antenna element generates an RF current with a different phase. In order to optimally use the RF currents generated, phase shifters 202 are provided in order to sequentially delay the RF currents so that all are essentially at the same phase and can be added in parallel or in series or as a combination thereof.

The RF current is conducted to an AC/DC converter 206, (this element is conventionally called an AC/DC converter even though the "AC" frequency is in the RF range) where the majority of the current is converted to DC, such that it can be supplied to the client device 207. A smaller part of the incoming RF current is reflected back towards the antenna array 201, because of any impedance mismatch at the AC/DC converter.

Because of the non-linear characteristic of the diodes in the AC/DC converters, some of the RF current may be reflected at harmonic frequencies of the incident RF frequency. Such harmonic frequencies may be forbidden by regulatory bodies from being retransmitted by the antenna array 201, and are thus filtered and attenuated by the filter 203. In addition, the reflected RF current may be further attenuated by use of an isolator 205, which has a high attenuation to the RF current in the reverse direction. The power of the returning wave is measured by an RF current sensor 204, typically at the coupled port of an output coupler, which may be located before or after the filter 203.

Before feeding to the antenna array, the phases of each of the reflected RF currents are shifted by the phase shifter in each antenna arm, by the same delay that they had undergone on their way forward from each antenna element, but in the opposite direction to the phase shift of the forward direction. The antenna array 201 thus retransmits a returned RF wave, along the same path direction as the RF wave which was incident on the antenna array 201, but counter propagating to that of the original incident RF wave.

The retransmitted wave is thus of the same frequency as the original incident wave and is counter propagating. Since the waves are of the same frequency and are coherent, the incoming wave, and the retransmitted wave interfere, and such interference of coherent counter propagating waves creates regions of higher and lower intensity. Those regions of higher intensity are known as hotspots, and may have a power intensity greater than that allowed by regulatory bodies, and hence, being accessible to humans or animals, may be harmful to them. The FCC limit for exposure to RF at high frequencies is currently 1 mW/cm$^2$, and a safe margin should typically be maintained from this limit. In order to transmit the maximum allowed level of power, systems may be designed that approach this limit, but without an unnecessarily large margin from it. Thus, because of the low permitted level of transmitted power, systems typically operate at close to this maximum permitted level, and any additional power generated by constructive interference with the retransmitted wave, will generally push the power of local hotspots over the permitted limit.

As previously mentioned, it is, however, impossible to know the power density in any hotspots from a knowledge of the transmitted power alone, as the local total power density is dependent on the level of the retransmitted wave. This then is the function of the power sensor 204, which measures the level of the reflected RF current, and hence can calculate the level of the reflected RF wave. This information can then be sent to a controller generally in the transmitter through a communication channel 208. The controller then has enough information to decide if there is a necessity to reduce, divert, or change the power of transmitted beam 209, in order to keep any hotspots to a level below the allowed power density, or alternatively, to instruct the receiver to change a parameter in order to reduce the level of the returning wave.

One cause of a larger than usual reflected RF current arises when, because of the low power level being used by the client device 207, it does not demand all of the converted DC current generated by the AC/DC converter 206, and the impedance presented to the input RF current by the AC/DC converter appears high. Consequently, a larger part of the RF current would be reflected back towards the antenna for retransmission. In such a case, the receiver may be instructed, either by its own internal controller or by the transmitter controller, to divert some of the input current to an energy dissipation or storage element, such as a resistor, a battery, a capacitor, a coil, or the like, in order to utilize more of the available power input to the antenna, and hence to reduce the level of the retransmitted RF wave.

Figure 3:
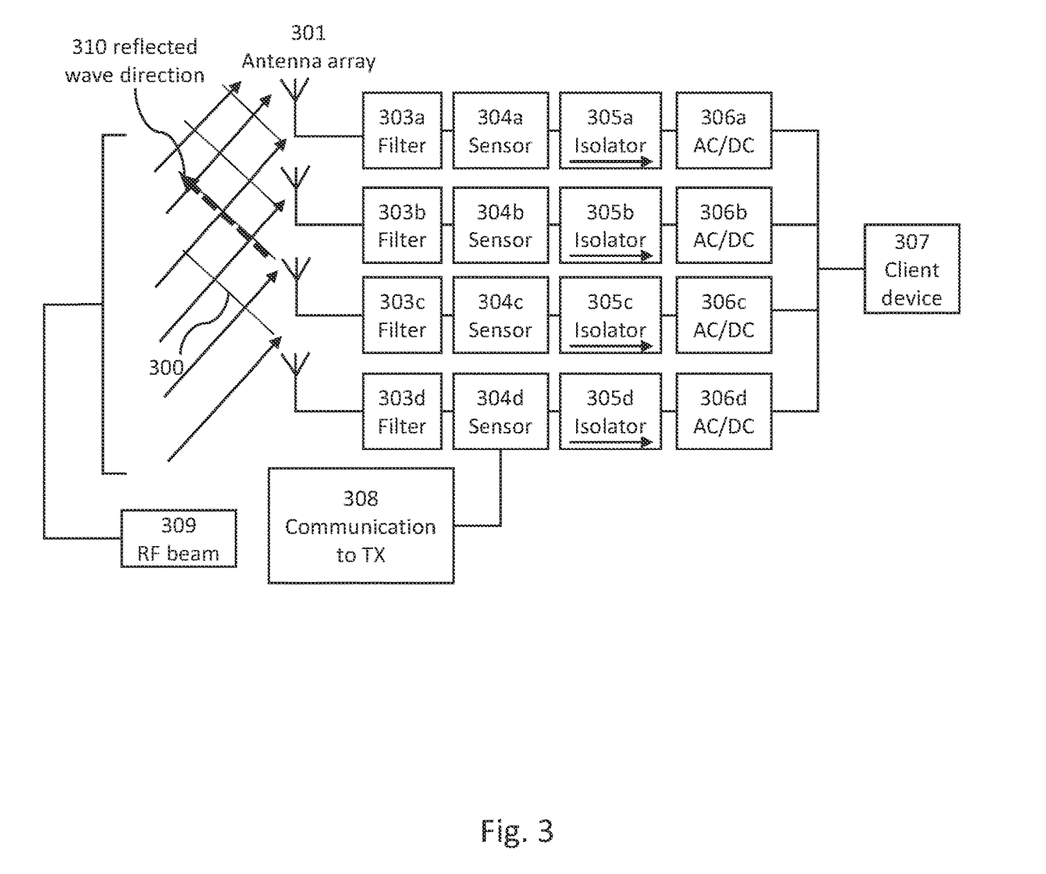
FIG. 3 shows alternative electrical circuitry system for combining the powers from the elements of a receiver antenna array.

Reference is now made to FIG. 3, showing an alternative system for combining the powers from the elements of antenna array 301. In the implementation shown in FIG. 2, the phase shifters are used to generate sequential phase shifts in the RF output current in each array element circuit, to bring all of the RF currents in their separate antenna circuits into the same phase. Consequently, all of the RF currents from the separate antenna circuits can be additively combined, and then measured, processed and converted in a single conversion and power handling circuit.

On the other hand, in the implementation shown in the system of FIG. 3, the RF currents generated in each antenna element are separately handled without any phase shifting, each by its own circuit, and separately measured, processed and converted to a DC current, and only thereafter can all of the DC currents be additively combined for supply to the client device.

The same propagating RF beam 309 emitted from the transmitter (not shown in FIG. 3) is represented by the medium thickness lines and propagates from the left bottom side of the drawing towards the top right. RF beam 309 is a coherent beam, and the thin lines 300 represent equiphase wavefronts of the RF transmission. In the absence of a returning wave, the wavefronts propagate at the speed of the wave.

As in the implementation shown in FIG. 2, the receiver of FIG. 3 is equipped with a phased array antenna 301, and the RF beam 309 is absorbed by the antenna array 301, the dimensions of each element in antenna array 301 being adapted to efficiently absorb the wave having a frequency of RF wave 309. The lateral dimension of each of the antenna of the array is optimally around half of the wavelength of the RF wave, and to provide some idea of the dimensions involved, these half-wavelength dimensions could range from 1.65 mm for an antenna element optimized to receive a 90 GHz wave, to 8.3 mm for an antenna element tuned to receive an 18 GHz wave.

A portion of RF wave 309 is Fresnel reflected by the antenna array 301 in direction 310, which is at the reflected ray at an angle to the array oppositely aligned to that of the incident beam 309. Since antenna array 301 is adapted to optimally absorb incident RF wave 309, such reflection is typically minimized but is always present.

A second portion of RF wave 309 is scattered in random directions by antenna array 301, the amount of scattered radiation being typically minimized by proper design of antenna array 309.

The major portion of RF wave 309, typically over 85% thereof, is absorbed by antenna array 301 and converted to an RF electrical current, and a small amount of heat. Since antenna array 301 is not aligned perpendicular to the propagation direction of RF wave 309, each antenna element generates an RF current with a different phase. In the embodiment of FIG. 3, because of the difference in phase of the RF currents in each antenna element circuit, each antenna element current is measured, processed and converted to a DC current in its own separate circuit, and only the output DC currents from each circuit are finally added to provide the current to be supplied to the client device. The embodiment of FIG. 3 thus saves the need for phase shifters in each antenna element circuit.

Each separate antenna element circuit operates in a similar manner to the common single circuit of FIG. 2. The RF current is conducted to an AC/DC converter 306$a,b,c$ . . . , where the majority of the current is converted to a DC current. The DC currents from all of the AC/DC converters 306$a,b,c$ . . . are added and then supplied to the client device 307. In each circuit, a small part of the incoming RF current is reflected back towards the antenna array 301, because of any impedance mismatch at the AC/DC converter. Because of the non-linear characteristic of the diodes in the AC/DC converters, some of the current may be reflected at harmonic frequencies of the incident RF frequency.

Such harmonic frequencies may be forbidden by regulatory bodies from being retransmitted by the antenna array 301, and are thus filtered and attenuated by the filter 303$a, b,c$ . . . . In addition, the reflected RF current may be further attenuated by use of an isolator 305$a,b,c$ . . . , which has a high attenuation to the RF current in the reverse direction. The power of the returning wave is measured by an RF current sensor 304$a,b,c$ . . . , typically at the coupled port of an output coupler, which may be located before or after the filter 303$a,b,c$ . . . .

The part of the incoming RF current that is reflected back towards the antenna array 301 is phase shifted relative to the incoming wave by essentially the same fixed amount in each separate circuit, since each separate circuit should essentially have the same geometry and dimensions. If there is any need to generate a different reflected phase delay in any circuit, this can be done by artificially adding length or loading to the circuit. Such differences in phase delay will result in the radiation from the antenna of that circuit being retransmitted at a different angle from that of the other circuits.

The returning reflected RF currents are retransmitted by the antenna array 301 as an RF retransmitted wave. Because the reflected RF currents in each circuit have undergone the same phase delay in their passage from the antenna element to the AC/DC converter, and in the opposite direction, from the AC/DC converter to the antenna array, the phase delays are additive, and, unlike the situation in the embodiment of FIG. 2, the retransmitted RF wave advances in the same direction 310 as the reflected wave, although with a different phase.

Since the retransmitted wave and the reflected waves are of the same frequency as the original incident wave, the three waves—the incoming wave, the reflected wave and the retransmitted wave—interfere, and the interference of three coherent waves creates regions of higher and lower intensity. Those regions of higher intensity are known as hotspots, and may have a power intensity greater than that allowed by regulatory bodies, and hence, being accessible to humans or animals, may be harmful to them. The FCC limit for exposure to RF at high frequencies is currently 1 mW/cm$^2$, and a safe margin should typically be maintained from this limit. In order to transmit the maximum allowed level of power, systems may be designed that approach this limit, but without an unnecessarily large margin from it.

It is, however, impossible to know the power density in any hotspots from a knowledge of the transmitted power alone, as the local total power density is dependent on the level of the retransmitted wave. This then is the function of the power sensors 304$a,b,c$ . . . , which measure the level of the reflected RF current in each circuit arm, and hence can calculate the level of the reflected RF wave. This information can then be sent to a controller generally in the transmitter through a communication channel 308. The controller then has enough information to decide if there is a necessity to reduce, /divert or change the power of transmitted beam 309, in order to keep any hotspots to a level below the allowed power density, or alternatively, to instruct the receiver to change a parameter of the receiver characteristics in order to reduce the level of the returning wave.

Figure 4:
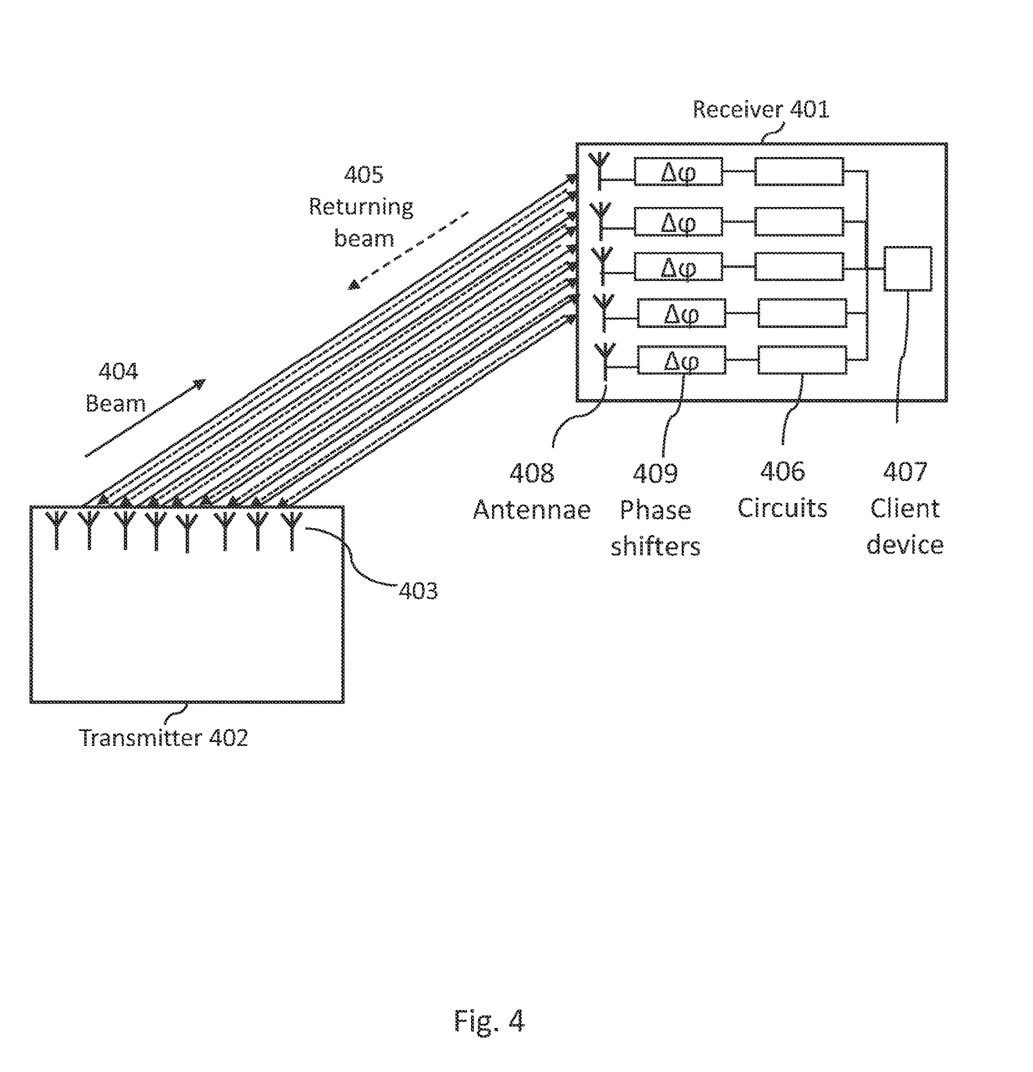
FIG. 4 is a schematic drawing of an exemplary implementation of a complete system, constructed using the circuitry of FIG. 2.

Reference is now made to FIG. 4 which is a schematic drawing of an exemplary implementation of a complete system, constructed according to the present disclosure, showing a transmitter 402 and a receiver 401. Transmitter 402 emits beam 404, shown using an antenna array, but which could be using another directional antenna such as a dish, towards the approximate direction of receiver 401. When beam 404 is correctly aimed at receiver 401, receiver 401 generates a retransmitted signal, shown as a returning beam 405, which is counter propagating to transmitted beam 404 in the direction of the transmitter 402.

Some prior art systems use detection of scattered radiation from the receiver to detect the presence and location of receivers. This method has a number of disadvantages:

1. The level of the scattered radiation is uncontrolled, the amount of scattering depending on the receiver's pose to the beam, the receiver's surface contaminations, its range, and many other factors.

2. Since scattering is non-directed, power is wasted by enabling scattering towards directions in which no use is made of the scattering direction.

3. The intensity of scattered radiation decays quadratically with distance from the scattering object, requiring a very high dynamic range from the detection systems 4. In order to detect the presence and location of a receiver, the transmitter will typically transmit a pulse of RF radiation, and attempt to detect the radiation scattered back from the receiver. To illustrate the technological difficulty of this procedure, a pulse of RF directed at a receiver positioned a meter from the transmitter, takes only of the order of 3.3 nsec. to reach the receiver, from which it is immediately scattered, and part of that scattered RF wave returned towards the transmitter unit, where it has to be detected. In this example, the scattered RF radiation arrives back at the transmitter after only 6.6 nsec., since the scattered radiation is returned without any delay at the receiver. Therefore, in order to differentiate between the transmitted pulse and the received scattered pulse, the transmitted pulse needs to be turned off extremely rapidly, so that the weak scattered radiation may be detected without being flooded out by any residual signal from the tail of the decaying transmitted pulse. Such a fast switching time of the transmitter requires circuits having a very high switching bandwidth. Similarly, the receiving circuitry to detect the scattered radiation must also have very fast detector elements and circuits, and hence having a very high bandwidth for detecting the returned pulse. Both transmitter switching and receiver detection and amplifying circuits are therefore complex and costly. This situation results from the inability to control the return time of the scattered return waves. Additionally, if the background noise of the system is taken into account, the problem becomes even more challenging.

In the system shown in FIG. 4, the above disadvantages are removed by providing the retransmitted RF beam from the receivers described in FIGS. 2 and 3, with a controlled and known time-delay, such that the detection of the retransmitted RF beam pulse can be made more accurately and with less stringent technology requirements for the electronic circuitry. Additionally, the retransmitted RF wave is directed by the receiver phased array antenna generally towards the direction of the transmitter, such that the received power of the signal does not significantly drop with distance.

The transmitter 402 could, for instance, transmit an RF pulse or beam 404, for example at 24.125 Ghz or 61.125 Ghz, towards a direction. The pulse or beam 404, should typically have a 3 dB bandwidth of less than 40 Mhz, and preferably around 20 Mhz or less. Such a beam pulse would be transmitted for a short time, typically less than a millisecond, and then be switched off, allowing the transmitter antenna(s) 403 and their circuits to switch to receiving mode. Receiver 401, upon receiving the pulse or beam 404, converts it to RF current as explained above, and generates a return beam 405, with a time delay arising from the geometry of the receiver, typically of between 2 and 20 ns. However, in order to lengthen this time delay beyond the natural time delay generated by the receiver geometry, delay circuits operating within the receiver can be used. Once the transmitter antenna circuits have switched to "receiving mode", they can then be used to detect returning beam 405, which has been retransmitted by receiver 401. Because of the longer time duration generated, following cessation of the transmitted wave, adequate time is available for the receiver circuitry to switch to receive mode, even using lower speed and hence simpler detection electronics.

Since both forwards beam 404, and the retransmitted beam 405 do not expand significantly along the distance between transmitter and receiver, the power drop with distance is minimized. Furthermore, since power levels of the returned beam and the delay time of the returned beam are determined by the engineering of the receiver system, and not by uncontrolled scattering, the detection of the returned beam can be better and more cost-effectively controlled.

Figure 5:
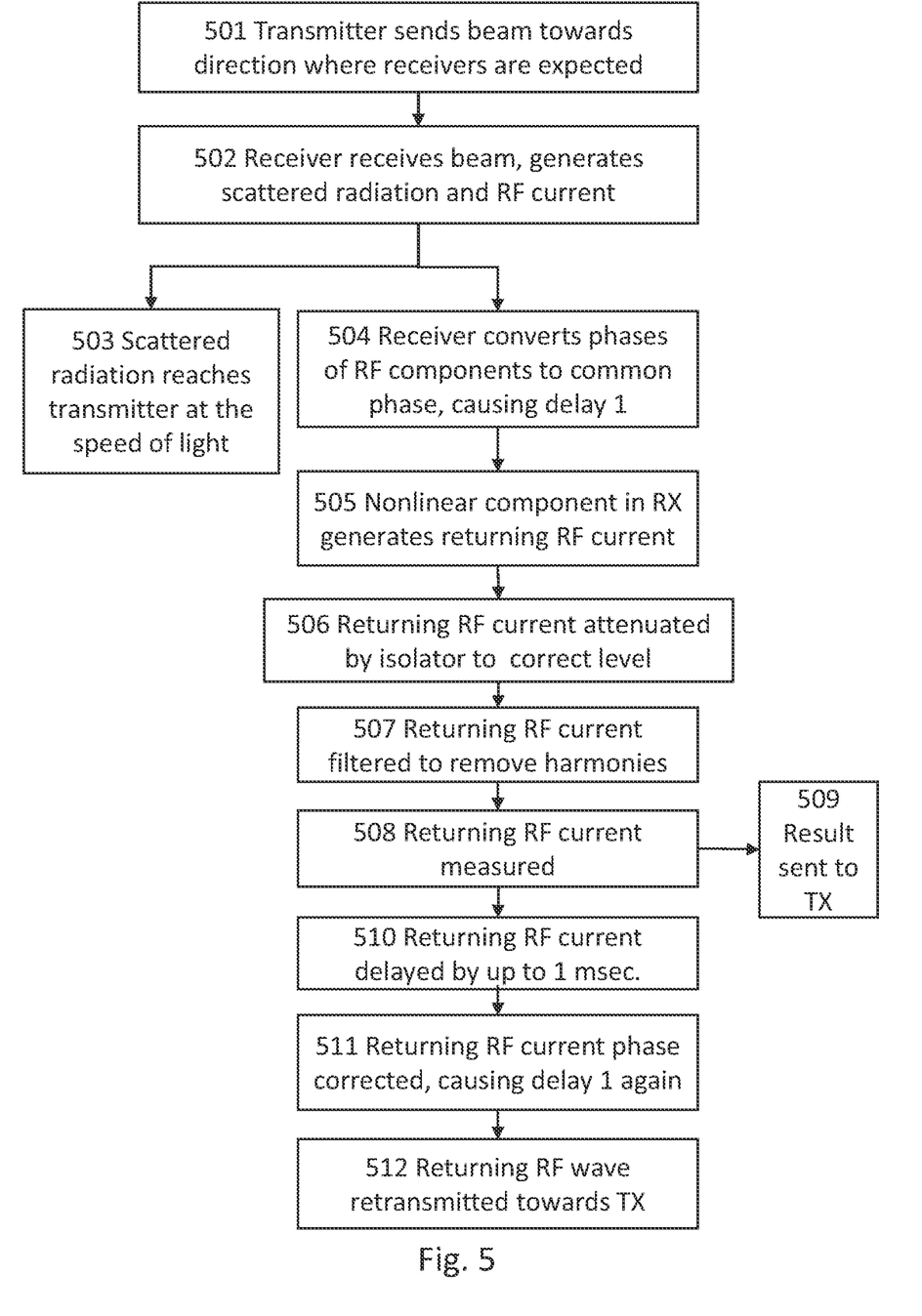
FIG. 5 is a flow chart of the methods by which the systems described in this application are able to detect the position of a receiver to which it is desired to transmit RF power, and to respond to the presence of a safety hazard in the beam path.

Reference is now made to FIG. 5, which is a flow chart of the methods by which the systems described in this application are able to detect the position of a receiver to which it is desired to transmit RF power, and the methods by which the transmitter is able to respond to the presence of a safety hazard in the beam path, by speedily and accurately changing the transmitter emission to prevent the safety hazard. The method of FIG. 5 relates to the receiver embodiment shown in FIG. 2, having the phase shifters to bring the RF currents from each of the antenna elements into the same phase.

In step 501 the transmitter directs an RF beam towards a direction in which a receiver is expected to be found.

In step 502, the receiver receives a portion of that RF beam, and generally only a portion, because initial aiming of the beam may not be sufficiently accurate, and the receiver may only intercept the edge of the beam.

In step 503, the impingement of the beam on the receiver causes scattering of a small portion of the power of the beam, and that scattered RF power travels back to the transmitter at the speed of light, and may be detected by the transmitter. This form of receiver detection is used in prior art implementations, and will not be discussed any further in this disclosure. The major part of the power of the beam is absorbed by the phased array antenna, where RF currents are generated.

In step 504, the RF currents generated by the antenna elements are phase shifted by passage through the individual phase shifters. Each separate RF current, as generated by a different phased array element, may be subjected to a different delay, such that all RF currents exit the phase shifter array at essentially the same phase.

In step 505, a returning RF current is generated, typically by impingement of the RF current on the voltage converter diode or other non-linear component, which represent an impedance mismatch to the incident RF current.

In step 506 the returning RC current level is adjusted, in order to ensure that the resulting RF wave returned from the antenna does not exceed a power level which would cause safety limits to be exceeded because of interference with the incident transmission beam, while at the same time maintaining a high enough power level to enable quantitative detection of the returned RF wave by the transmitter.

In step 507 the returning RF current is filtered to eliminate harmonics of the frequency of the transmission beam, since such overtones could contravene regulatory restrictions.

In step 508 the returning RF current is measured, so that an indication of the retransmitted RF power can be obtained.

It is also possible to measure the incoming wave power, if such information is useful for the system operational protocol.

In step 509, the measurements of the returning power, and if performed, the incoming RF power, are transmitted to the controller, usually in the transmitter, by means of a separate data channel transmission.

In step 510, a time delay, typically of up to 1 msec., is impressed on the returning RF current, such that the retransmitted RF wave will be temporally separated from a pulse of the incoming RF transmitted wave. The delay may arise from the geometry of the RF circuitry, or by use of an added delay line, and may even be of controlled duration, using known delay line techniques.

In step 511, the returning RF current is input into an array of phase shifters, and thus split into multiple components, each delayed by a different amount according to the phase shift applied by the relevant phase shifter.

In step 512, the separate components are then retransmitted back towards the controller in the transmitter, in the same direction but counter propagating to the original transmitted. In this method, steps 504-511 may be performed in a different order.

Figure 6:
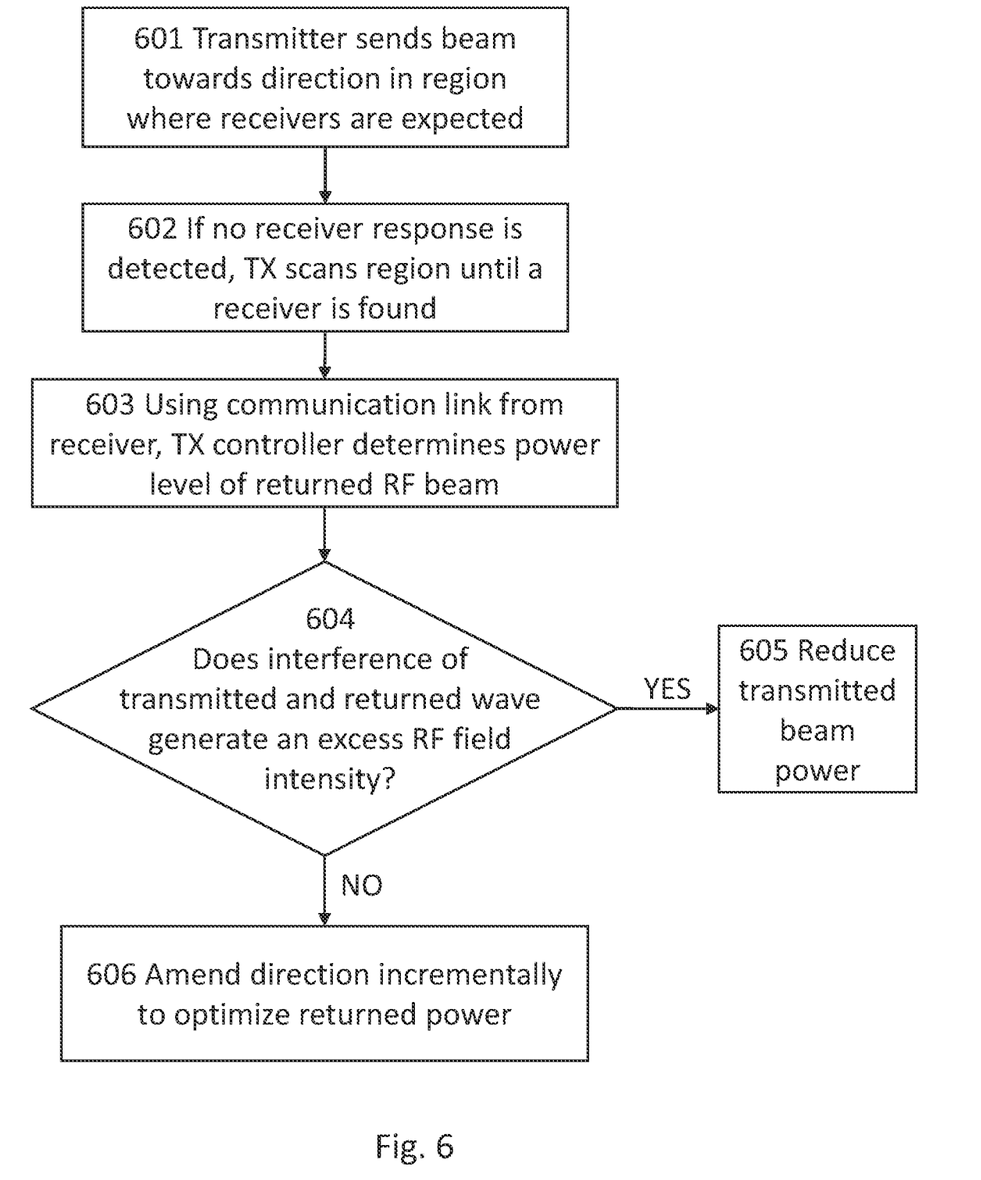
FIG. 6 is a flow chart of the methods by which the transmitter adjusts the beam direction to assist in finding and targeting a receiver to which it is desired to beam RF power.

Reference is now made to FIG. 6, which is a flow chart of the methods by which the transmitter adjusts the beam direction to assist in finding and accurately targeting a receiver to which it is desired to beam RF power. Additionally, the method ensures that the transmitter output is reduced if it becomes apparent that interference of the retransmitted wave with the transmitted wave may generate a power level which exceeds the regulatory allowed safe exposure to humans or animals.

In step 601 the transmitter sends an RF pulse towards a direction, typically within the bounds of the surroundings where a receiver is expected to be found.

In step 602, the controller, usually situated in the transmitter unit, determines whether a return retransmitted signal has been detected from the direction in which the RF pulse was sent, and if not, the transmitter scans the surroundings incrementally until a return retransmitted pulse is detected, indicating the presence of a receiver. If the transmitter uses a phased array antenna, such a scan can be performed at a very fast rate.

In step 603 the transmitter controller processes and interprets the digital wireless signal transmitted by the receiver which it has found, to generate an indication of the power level of the returning wave, and optionally also the power of the RF wave received by the receiver, and any other data which the receiver is programmed to send.

In step 604, the controller calculates whether the combined power generated by interference of the transmitted wave and the retransmitted returned wave exceeds a threshold, usually related to safety exposure limits.

In step 605, if the threshold has been exceeded, the controller instructs the transmitter to alter one or more of the direction, power or frequency, or any other parameters of the transmitted beam, in order to reduce such exposure.

In step 606 the system maximizes the power reported in step 603 by making small adjustments to the beam direction, until an optimum is achieved. In systems where phase shifts have discrete digital values, a small change in frequency may be used to generate beam direction movement.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. Furthermore, it is appreciated by persons skilled in the art that the present invention is not limited by what has been particularly shown and described hereinabove. Rather the scope of the present invention includes both combinations and subcombinations of various features described hereinabove as well as variations and modifications thereto which would occur to a person of skill in the art upon reading the above description and which are not in the prior art.

We claim:

1. A receiver for absorbing a first RF electromagnetic beam transmitted from a transmitter, and converting it into electrical power, the receiver comprising:
   an array of antennas for receiving the first RF electromagnetic beam;
   electrical circuitry connected to receive RF electrical current from the array of antennas, the electrical circuitry comprising at least one converter for generating a DC current from the RF electrical current, and the electrical circuitry comprising at least one component that reflects a first portion of the RF electrical current back towards the antenna array; and
   a transmitting device associated with the receiver, adapted to send to a controller associated with the transmitter, information including the level of the first portion of the RF electrical current reflected back towards the antenna array,
   wherein the antenna array is configured to convert the reflected first portion of the RF electrical current into a second RF electromagnetic beam for retransmission from the antenna array, the second RF electromagnetic beam having the same fundamental frequency as the first RF electromagnetic beam, and
   wherein the controller is configured to change the power transmitted by the transmitter towards the receiver, when the controller determines that the information including the level of the first portion of the RF electrical current reflected back towards the antenna array indicates that interference of the retransmitted second RF electromagnetic beam with the transmitted first RF electromagnetic beam would generate at least one local RF field intensity which exceeds a predetermined threshold.

2. A receiver according to claim 1, wherein a second portion of the RF electrical current is converted into the DC current.

3. A receiver according to claim 1, wherein the at least one component that reflects a first portion of the RF electrical current back towards the antenna array is at least one of a rectifying device, a rectifying bridge, a diode, or a semiconductor device.

4. A receiver according to claim 1, further comprising at least one filter positioned between the at least one component that reflects a first portion of the RF electrical current back towards the antenna array, and the antenna array, the filter being configured to attenuate the level of at least a first harmonic of the reflected RF electrical current.

5. A receiver according to claim 4, wherein the attenuation of the level of the at least first harmonic of the reflected RF electrical current reduces the level of the at least first harmonic component of the retransmitted second RF electromagnetic beam to a level below that allowed by a relevant regulatory authority.

6. A receiver according to claim 1, wherein the change in the power transmitted by the transmitter towards the receiver comprises at least one of:
   (i) reducing the power of the first RF electromagnetic beam transmitted;
   (ii) terminating the power of the first RF electromagnetic beam transmitted; or
   (iii) diverting the direction of transmission of the first RF electromagnetic beam.

7. A receiver according to claim 1, wherein the threshold is an intensity level permitted by a relevant safety regulation.

8. A receiver according to claim 1, wherein the controller is configured to adjust the direction of transmission of the first RF electromagnetic beam to maximize the level of the first portion of the RF electrical current reflected back towards the antenna array.

9. A receiver according to claim 8, wherein the maximization of the level of the first portion of the RF electrical current reflected back towards the antenna array indicates that the first RF electromagnetic beam is impinging centrally on the antenna array.

10. A receiver according to claim 1, wherein the information relating to the level of the first portion of the RF electrical current reflected back towards the antenna array is obtained from a sensor sampling the first portion of the reflected RF electrical current.

11. A receiver according to claim 10, wherein the sensor is disposed at the coupled port of an output coupler.

12. A receiver according to claim 1, wherein the antenna array is configured to retransmit the second RF electromagnetic beam either generally back along the direction of the first RF electromagnetic beam or generally in a direction towards which the first RF electromagnetic beam is reflected by the antenna array.

13. A receiver according to claim 1, wherein the electrical circuitry is configured to add a predetermined time delay to the reflected first portion of the RF electrical current, such that the retransmitting of the second RF electromagnetic beam also has the added predetermined time delay.

14. A receiver according to claim 13, wherein the predetermined time delay is generated either by circuitry geometry or by a component generating the delay.

15. A receiver according to claim 13, wherein the predetermined time delay is configured to be sufficiently long that the controller can detect the retransmitted second RF electromagnetic beam without interference from the transmitted first RF electromagnetic beam.

16. A receiver according to claim 1, wherein the RF electrical current from each antenna array element is directed into a separate circuit for conversion to a DC current, and the DC currents from at least some of the separate circuits are added for supplying to a device.

17. A receiver according to claim 1, wherein the RF electrical current from each antenna array element is directed into a separate phase shifter adapted to compensate for the phase differences in the RF currents generated in adjacent antenna elements of the array, and the phase shifted RF electric currents are combined into a single circuit for conversion to a DC current.

18. A receiver according to claim 17, wherein the phase shifts generated by the separate phase shifters are such that all of the RF electrical currents from the separate phase shifters are essentially in phase with each other.

19. A method of absorbing a first RF electromagnetic beam transmitted from a transmitter, and converting it into electrical power, the method comprising:
   absorbing the first RF electromagnetic beam on a receiver having an array of antennas for receiving the first RF electromagnetic beam;
   conveying an RF electrical current received from the array of antennas through electrical circuitry to a converter for generating a DC current from the RF electrical current, the electrical circuitry including at least one component that reflects a first portion of the RF electrical current back towards the antenna array; and
   transmitting from the receiver to a controller associated with the transmitter, information including the level of the first portion of the RF electrical current reflected back towards the antenna array, the antenna array converting
   the reflected first portion of the RF electrical current into a second RF electromagnetic beam for retransmission from the antenna array, the second RF electromagnetic beam having the same fundamental frequency as the first RF electromagnetic beam,
   wherein the controller is configured to change the power transmitted by the transmitter towards the receiver, when the controller determines that the information including the level of the first portion of the RF electrical current reflected back towards the antenna array indicates that interference of the retransmitted second RF electromagnetic beam with the transmitted first RF electromagnetic beam would generate at least one local RF field intensity which exceeds a predetermined threshold.

* * * * *